United States Patent [19]

Farnsworth et al.

[11] 4,283,476

[45] Aug. 11, 1981

[54] PHOTOGRAPHIC ELEMENT HAVING A MAGNETIC RECORDING STRIPE OVERLYING AN ANTISTATIC LAYER

[75] Inventors: Gary V. Farnsworth, Newark; Gerald C. Gandy, Rochester; Hugh W. Richards, Webster, all of N.Y.

[73] Assignee: Eastman Kodak Company, Rochester, N.Y.

[21] Appl. No.: 180,795

[22] Filed: Aug. 25, 1980

[51] Int. Cl.$^3$ ............................................... G03C 1/78
[52] U.S. Cl. .................................... 430/140; 430/529
[58] Field of Search ............................... 430/140, 529

[56] References Cited

U.S. PATENT DOCUMENTS 3,220,843  11/1965  Lovick et al. ..................... 430/140
3,418,126  12/1968  Ariga et al. ....................... 430/140
3,658,573  4/1972  Guestaux et al. .................. 430/529

*Primary Examiner*—Jack P. Brammer
*Attorney, Agent, or Firm*—A. P. Lorenzo

[57] ABSTRACT

Photographic elements comprising a support having on one side thereof at least one image-forming layer and on the opposite side an antistatic layer comprising a phosphate ester antistatic agent are provided with a magnetic stripe that is useful for sound recording by applying a magnetic striping composition over the antistatic layer. The magnetic striping composition is comprised of finely-divided magnetic particles and a polymeric binder in a solvent medium and contains an adhesion-promoting amount of a metal salt which provides strong bonding of the magnetic stripe to the photographic element and thereby overcomes problems of stripe separation.

32 Claims, No Drawings

PHOTOGRAPHIC ELEMENT HAVING A MAGNETIC RECORDING STRIPE OVERLYING AN ANTISTATIC LAYER

BACKGROUND OF THE INVENTION

This invention relates in general to photography and in particular to photographic elements provided with a magnetic stripe that is useful for sound recording. More specifically, this invention relates to photographic elements having a magnetic recording stripe overlying an antistatic layer, to a process for the manufacture of the aforesaid elements, and to a coating composition for use in the manufacture of the aforesaid elements.

It is well known to form magnetic recording stripes on photographic elements, such as motion picture films, and a variety of procedures have been developed to accomplish this objective. The magnetic recording stripe can be applied to the image-forming side of a photographic element, for example, it can be applied within a narrow groove formed within a silver halide emulsion layer. More typically, the magnetic recording stripe is applied to the side of the element opposite to the image-forming layer(s). Since photographic elements which require magnetic striping typically have a functional layer, such as an antihalation layer or an antistatic layer, on the side of the element opposite to the image-forming layer(s), the application of a magnetic recording stripe on this side presents a difficult problem. Thus, for example, localized removal of the functional layer to permit the striping composition to be applied directly to the support is usually impractical, whereas application over the functional layer frequently results in problems of inadequate bonding and resulting stripe separation.

Anti-halation layers which are located on the side of a photographic element opposite to the image-forming layer(s) are usually designed to be removed during processing of the element, and, accordingly, are comprised of a binder which is soluble in alkaline photographic processing solutions. Thus, if the magnetic stripe is applied over the anti-halation layer, it will be removed along with the anti-halation layer during processing unless suitable procedures are utilized to avoid such removal. Among the procedures which are known for this purpose is that of U.S. Pat. No. 3,220,843. As described in this patent, a magnetic stripe which is composite with the anti-halation layer and firmly adhered to the support so as to resist removal by alkaline photographic processing solutions can be formed by incorporating an N,N-dialkylamide in the magnetic striping composition. By use of the N,N-dialkylamide, the anti-halation layer is partially or completely dissolved in the region of the stripe and the striping composition is thereby able to reach the support and anchor thereto. A similar procedure is described in U.S. Pat. No. 3,647,541 in which the magnetic striping composition contains a combination of 2-methoxy ethanol and a dioxane. A different approach to the problem of applying a magnetic striping composition over an anti-halation layer is to incorporate in the magnetic striping composition an agent which is capable of reacting with the binder in the anti-halation layer to thereby insolubilize the anti-halation layer in the region of the stripe and prevent its removal in photographic processing solutions. This technique has been the subject of several patents, each of which relates to the use of particular insolubilizing agents; for example, the diazomethanes of U.S. Pat. No. 3,227,555, the compounds with reactive aldehyde groups of U.S. Pat. No. 3,840,374, the compounds having isocyanato or thioisocyanato groups of U.S. Pat. No. 3,870,525, the carbodiimides of U.S. Pat. No. 3,891,444, the m-benzene disulfofluorides of U.S. Pat. No. 3,999,992, and the combinations of bis-epoxides or polyepoxides with formamide or a sulfoxide of U.S. Pat. No. 4,008,088.

In the case where it is desired to apply a magnetic recording stripe over an antistatic layer which is on the side of the support opposite to the image-forming layer(s), the problem is somewhat different, since the antistatic layer is not usually intended to be removed during processing but rather is intended to be a permanent layer. However, it is frequently very difficult to achieve good adhesion of a magnetic stripe applied over an antistatic layer and, as a result, the stripe will often exhibit a tendency to separate from the element during handling and/or processing of the element. This is particularly the case with photographic elements in which the antistatic layer contains a phosphate ester which functions as an antistatic agent. Such use of phosphate ester antistatic agents is well known and is described, for example, in U.S. Pat. No. 3,658,573. The phosphate ester antistatic agents provide excellent antistatic protection to the photographic element, but typically make it very difficult to achieve good adhesion of an overlying magnetic stripe. Moreover, procedures which are effective in applying a magnetic striping composition over an anti-halation layer are generally ineffective when it is desired to stripe over the aforesaid phosphate-ester-containing antistatic layers; for example, the degree of adhesion may be inadequate or excessive curl in the region of the stripe may occur.

It is toward the objective of providing an improved composition and method for magnetic striping of photographic elements, in which the magnetic stripe is applied over an antistatic layer containing a phosphate ester which functions as an antistatic agent, that the present invention is directed.

SUMMARY OF THE INVENTION

It has now been discovered that greatly improved adhesion of a magnetic recording stripe, applied over an antistatic layer of a photographic element which contains a phosphate ester antistatic agent, can be achieved by incorporating in the magnetic striping composition a small amount of a carboxylic acid salt of a polyvalent metal. The photographic element comprises a support, for example a cellulose ester support, having on one side thereof one or more image-forming layers, for example, gelatin silver halide emulsion layers, and on the opposite side a thin antistatic layer comprising a phosphate ester antistatic agent, for example, potassium cetyl phosphate. The magnetic recording stripe is formed by applying over the antistatic layer, in the form of a narrow stripe, a composition containing finely-divided magnetic particles, a polymeric binder such as cellulose nitrate, one or more solvents, and the metal salt. The striping composition penetrates through and admixes with the antistatic layer to form a magnetic recording stripe which is composite with the antistatic layer and strongly bonded to the underlying support.

DESCRIPTION OF THE PREFERRED EMBODIMENTS

The method of this invention is useful for the application of magnetic recording stripes to a wide variety of photographic elements. The elements to which it is usefully applied have in common the presence of an antistatic layer that contains a phosphate ester antistatic agent, but they can differ widely in regard to the type of support, the number and composition of the image-forming layers, and the kinds of auxiliary layers which are present. In forming the magnetic stripe, the striping composition is applied over the antistatic layer and interacts chemically therewith to promote strong bonding. The invention provides a substantial advance in the art of magnetic striping in that the compositions employed provide greatly improved adhesion and thereby overcome problems of stripe separation that have hindered commercial utilization of this type of photographic element.

Magnetic striping commpositions are typically applied to photographic elements after the image-forming layer(s) and auxiliary layers have been applied. Thus, for example, a web support can be coated on one side with an antistatic layer, then coated on the opposite side with one or more image-forming layers, such as silver halide gelatin emulsion layers, then slit to a desired width, and then striped with a magnetic striping composition. This procedure is advantageous in that the wide web is adapted to efficient and economical coating of antistatic and image-forming layers and the narrow strips cut from the web are adapted to efficient and economical handling in a striping operation. However, the image-forming layer(s) can be applied after magnetic striping, if desired, so that the element to which the magnetic striping composition is applied can be comprised of a support, an antistatic layer and one or more image-forming layers or only of a support and an antistatic layer. In applying the magnetic striping composition after application of the image-forming layer(s) it is, of course, essential that the conditions utilized in applying and drying the stripe do not harm the sensitive image-forming layers.

The photographic elements of the present invention can be comprised of any of the useful photographic support materials. For example, the support can be composed of cellulose esters such as cellulose triacetate, cellulose acetate propionate or cellulose acetate butyrate, polyesters such as poly(ethylene terephthalate), polyamides, polycarbonates, polyimides, polyolefins, poly(vinyl acetals), polyethers, polysulfonamides, and the like.

The antistatic layer which is coated on one side of the support functions to protect the photographic element against the adverse effects resulting from accumulation of static electrical charges. These charges arise from a variety of factors during the manufacture, handling and use of photographic recording materials. For example, they can occur on sensitizing equipment and on slitting and spooling equipment, and can arise when film is unwound from a roll or as a result of contact with transport rollers. The generation of static is affected by the conductivity and moisture content of the photographic material and by the atmospheric conditions under which the material is handled. The degree to which protection against the adverse effects of static is needed is dependent on the nature of the particular photographic element. Thus, elements utilizing high speed emulsions have a particularly acute need for antistatic protection. Accumulation of static charges can cause irregular fog patterns in a photographic emulsion layer, and this is an especially severe problem with high speed emulsions. Static charges are also undersirable because they attract dirt to the photographic recording material and this can cause repellency spots, desensitization, fog and physical defects.

In the photographic elements of the present invention, the antistatic layer comprises a phosphate ester antistatic agent. The anitistatic agent can be the sole component of the antistatic layer or it can be used in admixture with other materials, for example, waxes and similar materials. A particularly useful material for blending with the phosphate ester is Carnauba wax.

Phosphate ester antistatic agents are well known and are described, for example, in U.S. Pat. No. 3,658,573. Preferred phosphate ester antistatic agents for the purposes of this invention are compounds of the formula:

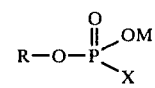

where R is a hydrocarbyl group, preferably containing 6 to 30 carbon atoms, such as an alkyl, aryl, aralkyl or alkaryl group; M is an alkali metal, such as sodium or potassium; and X is an —OM group or an —OR group.

As indicated by the above formula, the preferred phosphate ester antistatic agents are alkali metal salts of monoesters or diesters of phosphoric acid, including alkylphosphoric acid esters, arylphosphoric acid esters, alkarylphosphoric acid esters, and aralkylphosphoric acid esters. Where X is an —OM group, the compound is a monoester; where X is an —OR group it is a diester. Monoesters, diesters, and mixtures of monoesters and diesters are all usefully employed in the present invention. Particularly preferred phosphate ester antistatic agents include potassium mono-cetyl phosphate and potassium di-cetyl phosphate and mixtures thereof.

One or more image-forming layers are coated on the support on the side opposite to the antistatic layer. Other layers, such as subbing layers, interlayers, filter layers, protective overcoat layers and so forth can also be present. The image-forming layer or layers of the element typically comprise a radiation-sensitive agent, e.g., silver halide, dispersed in a hydrophilic water-permeable colloid. Suitable hydrophilic vehicles include both naturally-occurring substances such as proteins, for example gelatin, gelatin derivatives, cellulose derivatives, polysaccharides such as dextran, gum arabic, and the like, and synthetic polymeric substances such as water-soluble polyvinyl compounds like poly(vinylpyrrolidone), acrylamide polymers, and the like. A particularly common example of an image-forming layer is a gelatino/silver halide emulsion layer.

The magnetic striping compositions of this invention are comprised of a suspension of finely-divided magnetic particles in a liquid medium containing a polymeric binder and the metal salt. Cubic or acicular iron oxide ferromagnetic particles, particularly acicular gamma ferric oxides or acicular ferrous ferric oxides, are especially useful. Such particles may be doped with one or more metal ions of a polyvalent metal such as cobalt, nickel, chromium, zinc, manganese, and the like. A particularly desirable material is acicular gamma ferric oxide or ferrous ferric oxide having an acicularity ratio above 3, and preferably above 5, and an average particle size in the range from about 0.3 to about 1.2 microns. Additional suitable ferromagnetic particles include chromium dioxide, ferrites, alloys such as iron alloys, and the like.

The striping composition contains a suitable polymeric binder for the magnetic particles. Polymeric film-forming materials that are insoluble in alkaline solutions are generally utilized. Useful materials include binders prepared from cellulose or its derivatives such as cellulose esters and ethers as, for example, nitro-cellulose, cellulose acetate, cellulose acetate butyrate, cellulose propionate, cellulose butyrate, cellulose acetate propionate, methyl cellulose, ethyl cellulose and benzyl cellulose, polymerization products such as polyvinyl chloride and polyvinyl acetate, alkali-insoluble polyacrylic compounds or condensation products such as the products obtained by condensation of polyhydric alcohols with polybasic organic acids, as for example, alkyd resins such as the condensation product of glycerol and phthalic acid. Natural and artificial rubber, polyamides, polyesters, polyolefins, polyvinylacetals, methylmethacrylate resins, and polyurethanes are also suitable. Mixtures of the binders or of the binders and suitable plasticizers or humectants can also be used. For example, in using cellulose nitrate as a binder, it is advantageous to employ a plasticizer such as tricresyl phosphate to reduce brittleness.

Solvents which can be used in the magnetic striping composition can be any of a wide variety of relatively volatile liquids that are easily removed in the drying step, such as methyl alcohol, ethyl alcohol, isopropyl alcohol, butyl alcohol, 2,2,4-trimethylpentane, methylene chloride, carbon tetrachloride, methyl chloroform, methyl ethyl ketone, hexane, cyclohexylamine, hexanediamine, benzene, methyl glycol acetate, ethyl acetate, xylene, dioxane, ethylene diamine, 2-ethoxyethyl acetate, ethyl acetate, butyl acetate, amyl acetate, toluene, amyl alcohol, ethoxyethanol, propyl alcohol, and the like. Typically, a mixture of solvents is employed to provide a liquid medium with the desired viscosity, volatility, and degree of solvent activity.

The present invention is characterized by the incorporation in the magnetic striping composition of an adhesion-promoting amount of a carboxylic acid salt of a polyvalent metal. Illustrative polyvalent metals which are particularly effective for the purposes of this invention are chromium, iron, lead, calcium, zinc, manganese and cobalt. Useful salts include those of monocarboxylic and polycarboxylic acids of either aliphatic or aromatic types. Preferred salts are those of carboxylic acids containing 1 to 3 carboxyl groups and up to 20 carbon atoms. Typical examples of carboxylic acid salts of polyvalent metals which are useful for the purposes of this invention include:

lead formate
lead acetate
lead propionate
lead naphthenate
lead neodecanoate
lead octoate
lead tallate
lead butyrate
lead isobutyrate
lead citrate
lead stearate
lead maleate
lead phthalate
iron naphthenate
iron citrate
iron stearate
calcium naphthenate
zinc naphthenate
manganese naphthenate
cobalt naphthenate
chromium octoate
chromium naphthenate
and the like.

The terms by which the carboxylic acid salts are identified herein are used in a generic sense to include salts of the metal in any of its stable oxidation states. For example, the term "lead acetate" is intended to encompass both the acetate of divalent lead, which has the formula $(CH_3COO)_2 Pb$ and is commonly referred to as lead diacetate, and the acetate of tetravalent lead, which has the formula $(CH_3 COO)_4 Pb$ and is commonly referred to as lead tetraacetate. These terms are also intended to encompass both the anhydrous and hydrated forms of the metal salts.

While the exact mechanism whereby the present invention functions is not known with certainty, it is believed that the metal salt reacts chemically with the binder of the striping composition, and probably also with components of the antistatic layer such as the wax and/or the phosphate ester, in achieving the improvement in adhesion.

The metal salt can be used in any adhesion-promoting amount. Preferred amounts are in the range of from about 0.05 to about 1 percent by weight, based on the total weight of the magnetic striping composition, and most preferably in the range from about 0.2 to about 0.6 percent by weight.

In making up the magnetic striping composition, the magnetic particles are typically combined with the liquid medium, containing the binder and metal salt, in an amount of about 20 to about 150 parts of magnetic particles per 100 parts by weight of liquid medium. In order to obtain a uniform stable dispersion of the magnetic particles, the liquid medium preferably has a viscosity in the range from about 100 to about 1,000 centipoises.

The method of this invention comprises the steps of depositing the magnetic striping composition on the antistatic layer of the photographic element in the form of a narrow stripe and thereafter drying the stripe. Any of several different procedures can be used in carrying out the application of the magnetic striping composition on the antistatic layer of the photographic element. For example, it can be applied by the use of a coating apparatus having a rectangular extrusion slot, such as is described in U.S. Pat. No. 3,062,181, or with a coating apparatus comprising a die having a cylindrical bore as is described in Product Licensing Index, November 1971, Item No. 9111, Page 52, or with a coating apparatus comprising a die having two or more cylindrical bores as is described in Belgian Pat. No. 842,115. It can also be applied by the use of a gravure cylinder, using well known techniques of gravure or intaglio coating, or by the use of a grooved applicator roll. Drying of the stripe is conveniently carried out by passing it through a drying chamber in which it is contacted with warm air or other warm gaseous medium to evaporate the solvents. Many other procedures for drying the stripe are well known in the art and can be used if desired.

The magnetic stripe that is deposited in accordance with the present invention will vary in width and thickness depending on the requirements of the particular photographic element. For example, for 8-millimeter motion picture film, the magnetic recording stripe typically has a width of about 0.7 millimeters and a thickness of about 0.01 millimeters, while for 16-millimeter motion picture film, the magnetic recording stripe typically has a width of about 2.5 millimeters and a thickness of about 0.01 millimeters. Generally, a balance stripe is located on the same side of the photographic film as the recording stripe but adjacent to the opposite edge of the film and is intended to provide for uniform stacking of the film convolutions as the film is wound on a core. The balance stripe, which ordinarily is narrower than the recording stripe but of the same thickness, can be coated at the same time as the recording stripe or in a separate coating operation.

The magnetic striping composition of this invention is typically applied over the antistatic layer in the form of a narrow stripe but it can, of course, be applied to form a magnetic recording region of any desired geometrical configuration.

The invention is further illustrated by the following examples of its practice.

EXAMPLE 1

A magnetic striping composition was prepared from the following ingredients:

| Component | Weight % |
| --- | --- |
| Gamma ferric oxide | 26.77 |
| Cellulose nitrate | 6.35 |
| Tricresyl phosphate | 3.55 |
| Methyl ethyl ketone | 26.16 |
| Sec-amyl acetate | 22.39 |
| Ethoxyethanol | 12.06 |
| Isopropanol | 2.72 |
|  | 100.00 |

To prepare the striping composition, the aforesaid ingredients were added to a ball mill (charged with flint stones as the dispersing medium) and thoroughly milled. Dibasic lead acetate trihydrate [$(CH_3COO)_2Pb \cdot 3H_2O$] was then added at a concentration of 0.6% by weight and the dispersion was thoroughly mixed on a paint shaker and roller milled to dissipate bubbles.

The striping composition was coated in the form of a narrow stripe over the antistatic layer of a photographic motion picture film which had a support composed of cellulose triacetate, an antistatic layer on one side of the support composed of 20% by weight Carnauba wax and 80% by weight of the potassium salt of a mixture of mono- and di-cetyl phosphates, and gelatin silver halide emulsion layers on the opposite side. After drying, the stripe was found to be firmly adhered to the photographic film. To test the adequacy of stripe adhesion, a pressure-sensitive tape was firmly adhered to the magnetic stripe and then rapidly stripped from the surface either by use of a pendulum stripping arm or by hand. No removal of the stripe occurred. In contrast, when the lead acetate is omitted from the striping composition, as much as 50 percent or more of the stripe is removed by this test procedure. While the reason why improved adhesion was obtained by the use of lead acetate is not known with certainty, it is believed that it is probably because the lead crosslinks the free hydroxyl groups of the cellulose nitrate binder with the free phosphoric acid groups of the antistatic agent and/or the free acid groups available in the Carnauba wax.

EXAMPLES 2-15

Example 1 was repeated except that the lead acetate was replaced with each of the metal salts listed below utilized at the same concentration of 0.6% by weight.

lead phthalate
lead stearate
lead maleate
lead naphthenate
lead neodecanoate
lead octoate
lead tallate
iron naphthenate
calcium naphthenate
zinc naphthenate
manganese naphthenate
cobalt naphthenate
chromium octoate
chromium naphthenate In each instance, similar good adhesion of the magnetic stripe, as described in Example 1, was obtained.

Use of a metal salt to promote adhesion, as described herein, has many important benefits. For example, without the use of the metal salt, it is often necessary to use the phosphate ester antistatic agent in less than optimum amounts, since it is only by using a very low coverage of this material that acceptable adhesion of the stripe can be achieved. With the use of the metal salt, the phosphate ester antistatic agent can be used in any desired amount, and satisfactory adhesion of the stripe will still be obtained. This makes it feasible to use the phosphate ester antistatic agent in an optimum amount based on the desired conductivity level. A further advantage of the use of the metal salt is that it permits the use of less active solvents in the striping composition. Without the use of the metal salt, it is often necessary to use solvents which are quite active, i.e., which tend to function as "biting agents," to obtain acceptable stripe adhesion, but such active solvents have the disadvantage of contributing to support curl in the stripe area, and this curl can degrade the sound quality potential of the magnetic stripe. With use of the metal salt, less active solvents which do not have as severe an effect on curl can be employed and adequate stripe adhesion can still be obtained. Accordingly, use of the metal salt provides improved formulation latitude.

The invention has been described in detail with particular reference to preferred embodiments thereof, but it will be understood that variations and modifications can be effected within the spirit and scope of the invention.

We claim:

1. A photographic element comprising a support having on one side thereof at least one radiation-sensitive layer and on the opposite side an antistatic layer comprising a phosphate ester antistatic agent, said element additionally comprising a magnetic recording stripe overlying said antistatic layer, said magnetic recording stripe comprising magnetic particles dispersed in a polymeric binder and containing a carboxylic acid salt of a polyvalent metal in an amount sufficient to enhance the adhesion of said stripe to said element.

2. A photographic element as claimed in claim 1 wherein said support is a cellulose ester support.

3. A photographic element as claimed in claim 1 wherein said support is a cellulose triacetate support.

4. A photographic element as claimed in claim 1 wherein said phosphate ester antistatic agent has the formula

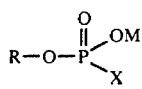

where R is a hydrocarbyl group, M is an alkali metal, and X is an —OM group or an —OR group.

5. A photographic element as claimed in claim 1 wherein said phosphate ester antistatic agent is potassium mono-cetyl phosphate.

6. A photographic element as claimed in claim 1 wherein said phosphate ester antistatic agent is potassium di-cetyl phosphate.

7. A photographic element as claimed in claim 1 wherein said phosphate ester antistatic agent is a mixture of potassium mono-cetyl phosphate and potassium di-cetyl phosphate.

8. A photographic element as claimed in claim 1 wherein said polymeric binder is cellulose nitrate.

9. A photographic element as claimed in claim 1 wherein said salt is a salt of a carboxylic acid containing 1 to 3 carboxyl groups and up to 20 carbon atoms.

10. A photographic element as claimed in claim 1 wherein said salt is a salt of chromium, iron, lead, calcium, zinc, manganese or cobalt.

11. A photographic element as claimed in claim 1 wherein said salt is lead acetate.

12. A photographic element as claimed in claim 1 wherein said salt is iron naphthenate.

13. A photographic element as claimed in claim 1 wherein said salt is chromium octoate.

14. A photographic element comprising a support, an antistatic layer on said support comprising a phosphate ester antistatic agent, and a magnetic recording stripe overlying said antistatic layer, said magnetic recording stripe comprising magnetic particles dispersed in a polymeric binder and containing a carboxylic acid salt of a polyvalent metal in an amount sufficient to enhance the adhesion of said stripe to said element.

15. A photographic element as claimed in claim 14 wherein said salt is chromium octoate.

16. A photographic element comprising a support, an antistatic layer on said support comprising a phosphate ester antistatic agent, and a magnetic recording region overlying said antistatic layer, said magnetic recording region comprising magnetic particles dispersed in a polymeric binder and containing a carboxylic acid salt of a polyvalent metal in an amount sufficient to enhance the adhesion of said magnetic recording region to said element.

17. A photographic element comprising a support having on one side thereof at least one radiation-sensitive layer and on the opposite side an antistatic layer comprising a phosphate ester antistatic agent, said element additionally comprising a magnetic recording region overlying said antistatic layer, said magnetic recording region comprising magnetic particles dispersed in a polymeric binder and containing a carboxylic acid salt of a polyvalent metal in an amount sufficient to enhance the adhesion of said magnetic recording region to said element.

18. A photographic element comprising a support having on one side thereof at least one radiation-sensitive layer and on the opposite side an antistatic layer comprising a phosphate ester antistatic agent, said element additionally comprising a magnetic recording stripe overlying said antistatic layer, said magnetic recording stripe having been formed by depositing on said antistatic layer a stripe of a composition comprising a suspension of finely-divided magnetic particles in a liquid medium and drying said stripe, said liquid medium comprising a polymeric binder and a carboxylic acid salt of a polyvalent metal, said salt being present in said striping composition in an amount sufficient to enhance the adhesion of said stripe to said element.

19. A photographic motion picture film comprising a cellulose triacetate support having on one side thereof at least one gelatin silver halide emulsion layer and on the opposite side an antistatic layer comprising potassium mono-cetyl phosphate, said film additionally comprising a magnetic recording stripe overlying said antistatic layer, said magnetic recording stripe having been formed by depositing on said antistatic layer a stripe of a composition comprising a suspension of finely-divided magnetic particles in a liquid medium, said liquid medium comprising cellulose nitrate and chromium octoate, said chromium octoate being present in said striping composition in an amount sufficient to enhance the adhesion of said stripe to said film.

20. In a method of forming a magnetic recording stripe on a photographic element, said element comprising a support having on one side thereof at least one radiation-sensitive layer and on the opposite side an antistatic layer comprising a phosphate ester antistatic agent, which method comprises applying over said antistatic layer a stripe of a magnetic striping composition comprising a suspension of finely-divided magnetic particles in a solution of a polymeric binder, the improvement wherein said striping composition additionally contains a carboxylic acid salt of a polyvalent metal in a concentration sufficient to enhance the adhesion of said stripe to said element.

21. A method as claimed in claim 20 wherein said support is a cellulose ester support.

22. A method as claimed in claim 20 wherein said support is a cellulose triacetate support.

23. A method as claimed in claim 20 wherein said phosphate ester antistatic agent has the formula

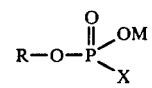

where R is a hydrocarbyl group, M is an alkali metal, and X is an —OM group or an —OR group.

24. A method as claimed in claim 20 wherein said phosphate ester antistatic agent is potassium monocetyl phosphate.

25. A method as claimed in claim 20 wherein said phosphate ester antistatic agent is potassium di-cetyl phosphate.

26. A method as claimed in claim 20 wherein said phosphate ester antistatic agent is a mixture of potassium mono-cetyl phosphate and potassium di-cetyl phosphate.

27. A method as claimed in claim 20 wherein said polymeric binder is cellulose nitrate.

28. A method as claimed in claim 20 wherein said salt is a salt of a carboxylic acid containing 1 to 3 carboxyl groups and up to 20 carbon atoms.

29. A method as claimed in claim 20 wherein said salt is a salt of chromium, iron, lead, calcium, zinc, manganese or cobalt.

30. A method as claimed in claim 20 wherein said salt is lead acetate.

31. A method as claimed in claim 20 wherein said salt is iron naphthenate.

32. A method as claimed in claim 20 wherein said salt is chromium octoate.

* * * * *